United States Patent [19]

Braun

[11] Patent Number: 5,119,289
[45] Date of Patent: Jun. 2, 1992

[54] DEVICE FOR PROTECTING AN ELECTRIC OPERATING MEANS

[75] Inventor: Uwe Braun, Heimsheim, Fed. Rep. of Germany

[73] Assignee: ASEA Brown Boveri Ltd., Switzerland

[21] Appl. No.: 449,590

[22] Filed: Dec. 12, 1989

[30] Foreign Application Priority Data

Dec. 16, 1988 [CH] Switzerland ............ 4649/88-3

[51] Int. Cl.5 .................................... G06F 15/16
[52] U.S. Cl. ................... 364/184; 371/11.3; 364/133
[58] Field of Search ......... 364/184, 185, 187, 229.41, 364/132, 133; 371/11.3, 68.3

[56] References Cited

U.S. PATENT DOCUMENTS

| | | | |
|---|---|---|---|
| 4,327,437 | 4/1982 | Gelderloos | 371/68.3 |
| 4,344,134 | 8/1982 | Barnes | 364/200 |
| 4,376,973 | 3/1983 | Chivers | 364/200 |
| 4,442,521 | 4/1984 | Inaba et al. | 364/186 |
| 4,791,547 | 12/1988 | Petroff | 364/132 |
| 4,953,074 | 8/1990 | Kametani et al. | 364/132 |

OTHER PUBLICATIONS

O. P. Malik and G. S. Hope: Design Concepts for a Distributed Microprocessor-Based . . . ; Aug. 1981; pp. 1721-1725.

K. Tanaka, et al.; Application of Microprocessors to the Control and Protection . . . ; Jan. 1980; pp. 344-351X.

H. Ungrad, et al; A Modern Supervisory Control Protection Concept for Enhancing Power . . . ; Sep., 1984; pp. 400-404.

*Primary Examiner*—Jerry Smith
*Assistant Examiner*—Patrick D. Muir
*Attorney, Agent, or Firm*—Ostrolenk, Faber, Gerb & Soffen

[57] ABSTRACT

A protective system for an electrical network includes input and output units (E/A-1, . . . , E/A-7) and a data processing unit. The input and output units detect and digitize incoming analog signals present at outlets (1, . . . , 7) of an electric-operating means which needs to be protected, for instance a bus bar. The digitized measurement signals are hierarchically connected/coupled to the data processing unit, in accordance with predetermined protective criteria. Thus, error signals which are generated in response to the detection of system failures are supplied via the input and output units (E/A-1, . . . E/A-7), and these error signals act upon switching stations provided at the outlets (1, . . . , 7). With each of the outlets, for instance outlet 3, there are associated two input and output units, for instance units E/A-1, and E/A-3, which units operate independently of one another. The data processing unit is in the form of a data-transfer and processing network and includes computers ($T_1$, . . . , $T_6$) which act through a plurality of network nodes. The protective device of the invention is characterized by having a high level of redundant circuitry and is modularly constructed to obtain system expandability and flexibility.

9 Claims, 2 Drawing Sheets

DEVICE FOR PROTECTING AN ELECTRIC OPERATING MEANS

BACKGROUND OF THE INVENTION

The present invention relates to a device for protecting an operating means which can be connected to or disconnected from an electrical network at various switching points.

The present invention proceeds from the state of the art relating to a protective device such as is described, for instance, in Federal Republic of Germany patent document A-3 132 730. This known protective device serves for monitoring and guiding an operating means, for example a bus bar or the like, which is deployed in an electric-energy supply network. The known device has various data measurement/acquisition units which record and digitize current, voltage and switch-position signals provided at outputs of the operating means, and further includes a data processing unit.

The data processing unit contains microprocessor systems which are arranged in two hierarchical levels. One microprocessor system, which is arranged in a subordinate hierarchical level, processes and transforms, in real-time, the measurement signals which have been digitized in the measurement/acquisition unit, while a microprocessor system arranged in a higher hierarchical level computes protection algorithms therefrom, by reference to a reduced quantity of data. This second microprocessor system also determines whether errors are present in the electrical network.

SUMMARY OF THE INVENTION

The present invention is particularly directed toward increasing circuit redundancy with respect to the transmission and processing of data in a protective device of the type referred to herein.

The protective device of the invention is characterized in that it has a high operational reliability since, even in the event of the failure of one of the network nodes of the data transfer network and/or of an input and output unit, the continued and full operability of the protective function is maintained. In this connection, by suitably dimensioning the computing power and performance level of the computer, the lack of computing capacity at a disturbed or defective network node is handled in simple fashion. Furthermore, the protective device of the invention is deliberately constructed to have high computing capacity and a modular construction, so that its computing powers can be expanded and made available to different nodes in the network as desired.

It is, therefore, of particular advantage that in the event of the failure of one or more network nodes, the network topology can be dynamically adapted to the requirements of the network nodes which are still operational.

Other features and advantages of the present invention will become apparent from the following description of the invention which refers to the accompanying drawings.

DETAILED DESCRIPTION OF THE PREFERRED EMBODIMENTS

Figure 1:
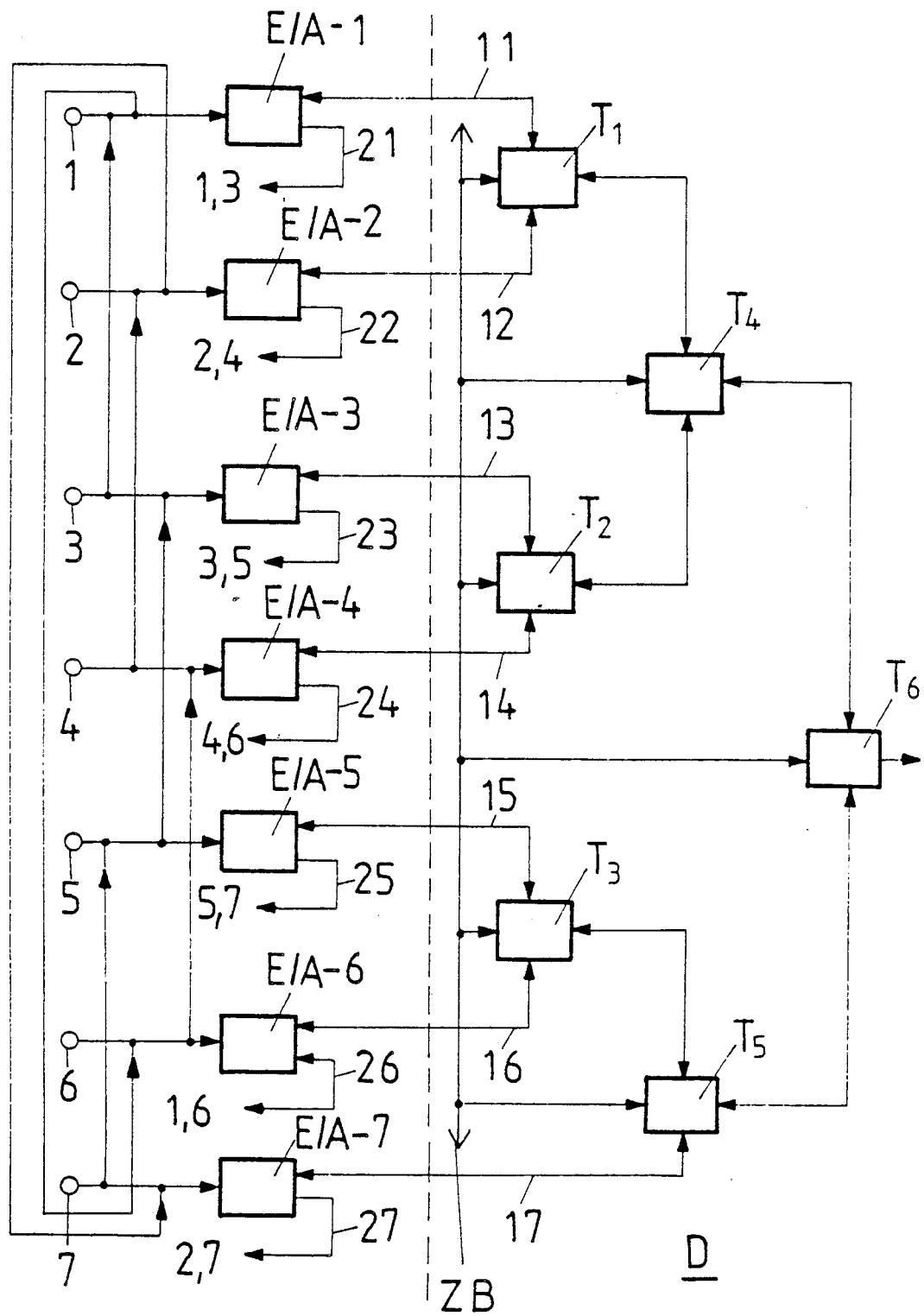
FIG. 1 is a basic circuit diagram of a first embodiment of the protective device of the invention.

The protective device according to FIG. 1 has input and outputs units E/A-1....., E/A-7, a data transfer and processing network D, and transmission lines 11,...,'17 by which the data transfer and processing network D is connected to the input and output units E/A-1, ... ,E/A-7. The protective device is housed in a cabinet.

The input and output units E/A-1, ... , E/A-7 are essentially formed of three blocks, each block serving for inputting analog measurement signals from outlets 1,...,7 of an electric operating means, for instance a bus bar of a switching system. Inputting and outputting of binary data is also carried out through the units E/A-1, ... , E/A-7.

Measured signals may include current and/or voltage signals of transducers which signals are made available at the outlets 1–7, but may also include position-indicating signals of switching stations present at the outlets. Each input and output unit detects the signals of two or more different outlets, for instance outlets 3 and 5 in the case of unit E/A-3. The analog signals detected are digitized in the input and output units and possibly further processed, for instance by being filtered.

Digital data are outputted from the units E/A-1, ... ,E/A-7 and are transmitted by means of the lines 11, .. . ,17 to computers $T_1$, $T_2$, $T_3$ and $T_5$ of the data transfer and processing network D. The units E/A-1, ... ,E/A-7 furthermore output binary data which are supplied via lines 21,. .. , 27 to trigger switching stations present at the outlets 1, ... ,7. Each of these blocks, for instance the ones which are associated with the input and output unit E/A-3 can, in this connection, act, in accordance with the measurement signals received, on the switching stations of two or more outlets, for instance outlets 3 and 5.

Digital protection data determined by the data transfer and processing network D on the basis of the digital measurement data transmitted to it over the lines 11, .. . ,17 are detected by a third block and delivered, possibly after processing in the input and output units E/A-1, ... ,E/A-7, as trigger signals to the switching stations which are coupled to the outlets 1, ... ,7.

The data transfer and processing network D is comprised of computers $T_1$, ... ,$T_6$, arranged in a hierarchical configuration. Each of the hierarchically lowermost computers $T_1$, $T_2$ and $T_3$ is connected to two of the input and output units, respectively. Thus, for instance, computer $T_1$ is connected to the input and output units E/A-1 and E/A-2.

The hierarchically higher level computer $T_4$ is, on the other hand, connected to the computers $T_1$ and $T_2$, and the hierarchically equivalent computer $T_5$ is connected to the computer $T_3$ and also directly to the input and output unit E/A-7. The hierarchically highest computer $T_6$ is connected to the computers $T_4$ and $T_5$. In addition, the computer $T_6$ is connected via a central bus ZB to all the other computers $T_1$, ... , $T_5$ of the data transfer and processing network D. Thus, the computers $T_1$, ... , $T_5$ are interconnected in a binary tree configuration, the root of which is formed by the computer $T_6$.

The computers $T_1$, ..., $T_6$ can be arranged on PC cards, for instance in PC cards having a dual-European format. Each card can be provided with four and possibly six computers, each having a RAM of 128 kByte to 1 MBytes and an EPROM of 128 kBytes to 250 kBytes. The connections of the individual processor units on each card and between different cards is preferably effected by cross-bar switches. In this way, a variable topology data transfer and processing network D is obtained, within certain limits. Thus, for instance, in the event of a disturbance of the data transfer and processing network at one location, the configuration of the network can be switched extremely rapidly to a configuration which avoids or works around the trouble spot.

The connections of the computers $T_1, \ldots, T_6$ to each other can be implemented by shielded twisted line pairs or light guides, e.g. fiber optic cables. In order to keep the expense for wiring low, the computers are connected with each other on individual board or via short electrical lines arranged in a common cabinet.

The operation of the protective device of the present invention is as follows. The measurement signals at each of the outlets 1, ..., 7, are transmitted, after being digitized and possibly preprocessed in the input and output units E/A', ..., E/A-7, to the computers $T_1$, $T_2$, $T_3$ and $T_5$, via the lines 11, ..., 17, where these signals are subjected to a first order of processing.

The digitized signals are transmitted serially, preferably at 10 or 20 Mbits per second to meet an expected data block size of about 50 bytes per output scanning step. The transmission from one network node to the next takes about 50 microseconds in the case of 10 Mbits per second.

In the second phase of processing, i.e. processing carried out in the computers $T_4$ and $T_5$, the data supplied by the computers $T_1$, $T_2$, and $T_3$ as well as the input and output unit E/A-7 are processed and the results obtained thereby are forwarded to the computer $T_6$ where the highest hierarchical processing is carried out. The processing and the transfer of the data, therefore, is accomplished in a single processing sequence.

The number of processing steps in the data network is proportional to the base 2 logarithm of the number of outlets desired, i.e., M=ENTIER (1D(N)+0.99) in which M=the number of steps, N=the number of outlets and ENTIER represents the integer part of the calculated value between the parenthesis.

If it is assumed that the analog to digital conversion $t_w$ in the input and output units requires about 100 microseconds. The processing time $t_r$ in each hierarchical group of the computers $T_1, \ldots, T_6$ also requires about 100 microseconds and the transmission time $t_c$ from group to group of the computers requires about 50 microseconds. In FIG. 1, since there are three hierarchical groups of computers, a total of 550 microseconds will elapse before the result of the calculation of the total current in the data network is completed in the highest hierarchical computer $T_6$.

Generally speaking, with a number of hierarchical steps M in the data transfer and processing network D, the total time $t_g$ which elapses from the scanning of the measurement signals until the presence of the final results in the computer of the highest hierarchical step can be obtained by solving:

$$t_g = t_w + M(t_r + t_c)$$

On the basis of the data processing, any error signals which are generated pass over the data transfer and processing network D to the input and output units E/A-1, ..., E/A-7 are are supplied, for the purpose of forming a trigger compound, to the switching stations associated with the outlets 1, ..., 7.

If one of the input and/or output units and/or one of the computers is defective, the operation of the protective device continues. If, for instance, the input and output unit E/A-3 fails, then the measurement signals of the outlet 3 are detected by the input and output unit E/A-1 and transmitted to the computer $T_1$ of the data transfer and processing network D and, conversely, the error signals detected by the data transfer and processing network D are sent, via the input and output unit E/A-1, to the switching station associated with the outlet 3 (and possibly to the switching station associated with the outlet 1 as well).

If, in addition, any computer should fail, for instance the computer $T_4$, the flow of data from the computers $T_1$, $T_2$, to the computer $T_6$ will be interrupted. However, since the computer $T_6$, like all of the other computers $T_1, \ldots, T_5$, is intercoupled to all the computers in the network, the computer $T_6$ will determine after a relatively short time that computer $T_4$ has failed. The computer $T_6$ will then directly interrogate the computers $T_1$ and $T_2$ via the central bus ZB or send data directly via computers $T_1$ and $T_2$ to the input and output units E/A-1, ..., E/A-7.

The central bus ZB serves in this device as a system-wide communication medium. At the same time, it can also be used to monitor events and processes which take place in parallel in the various computers. Indeed, by means of another computer (not shown) which may be temporarily connected to the system, the entire operation of the data network D may be monitored, current tasks stopped, or the conditions of the individual computers interrogated.

Figure 2:
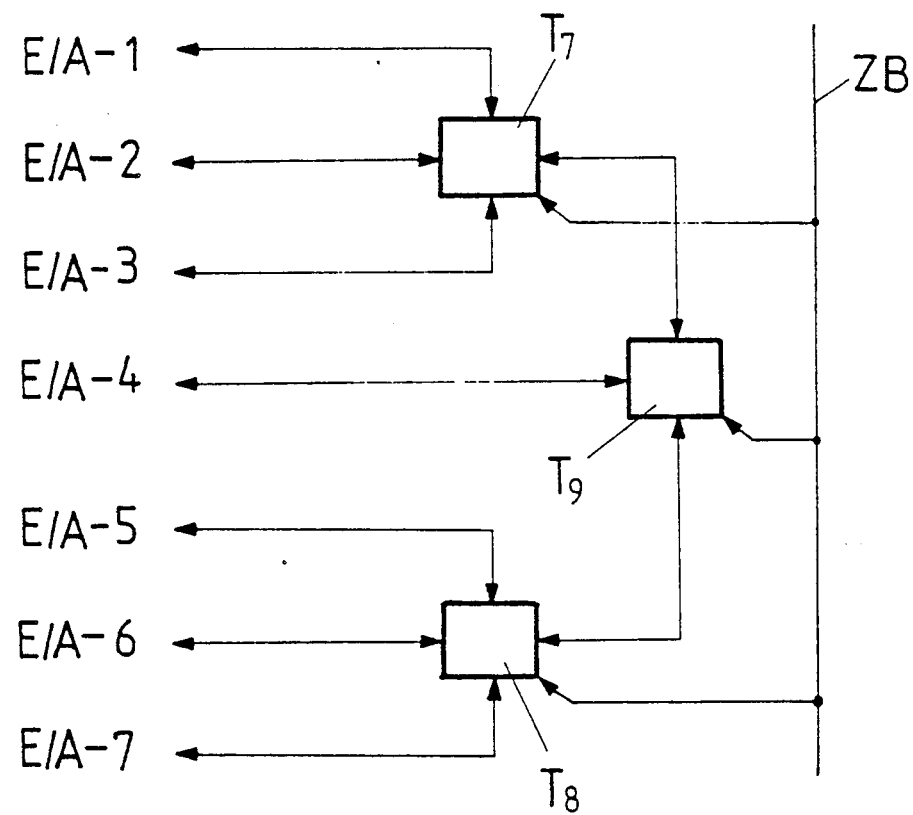
FIG. 2 depicts a data transfer and processing network of a second embodiment of the protective device of the invention which is modified as compared to the embodiment shown in FIG. 1.

It is particularly preferable to associate with each computer a control unit, for example a 8031 controller IC which is available from the INTEL Company. Such a control unit is then used as interface for the central bus ZB. One advantage of this embodiment of the protective device of the invention— shown by way of example in FIG. 2 —derives from the possibility of connecting each of the computers $T_1, \ldots, T_6$ to another computer group $T_7, \ldots, T_9$ or to another input and output device E/A-1, ..., E/A-7. As a result, the manufacturing cost of the protective device of the invention is reduced. Furthermore, several tasks can be carried out readily and in parallel in the protective device of the invention. Furthermore the computers $T_7, \ldots, T_9$ might also be relieved from routine management tasks and freed for communication, such as, for instance, station recognition. Such will however occur only in the event that these controllers advise the computers $T_1, \ldots, T_6$ that this is to take place.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A monitoring and protecting system for an operating means of an electrical network, the system comprising:
   a plurality of outlets associated with the operating means, the outlets effective for providing incoming signals;

a plurality of input and output units coupled to the outlets in a manner so that each of the outlets is coupled to at least two of said input and output units, each of said input and output units operating independently of one another;

a data transfer and processing network coupled to the input and output units and effective for generating error signals on the basis of information contained in the incombing signals;

the operation means being coupled to the electrical network through the input and output units and through switching stations connected to the electrical network, said error signals are effective for operating said switching stations;

said data transfer and processing network comprising a plurality of computers, said computers being divided in a plurality of hierarchically arranged groups;

the computers including a plurality of hierarchically lowest level computers, each of said hierarchically lowest level computers being connected to at least two of said input and output units; and further comprising at least one hierarchically intermediate level computer, at least one of said at least one hierarchically intermediate computer being connected to at least two computers belonging of said hierarchically lowest level computers.

2. The system of claim 1, further comprising at least one hierarchically highest level computer, said at least one hierarchically highest level computer being connected to all other of said computers in said network.

3. The system of claim 2, wherein said plurality of computers are connected in a binary tree configuration, with a root of said binary tree being comprised of a single computer which comprises said hierarchically highest level computer.

4. The system of claim 3, further comprising a common bus connecting all said computers.

5. A monitoring/protection system for protecting an operating means which can be optionally connected or disconnected from an electrical network through switching stations, and which provides measurement signals at outlets of said switching stations, said system comprising:

at least two input and output units which are operable independently of one another, each of the said measurement signals being supplied to at least two of said input and output units; and a data processing unit in the form of a data transfer and processing network including a plurality of computers which are arranged at network nodes, said measurement signals being digitized in said input and output units and being supplied to said data transfer and processing network and said data transfer and processing network being effective for generating error signals for controlling the state of said switching stations;

wherein said computers are arranged hierarchically and wherein said computers include lowest hierarchical computers each of which is connected to at least two of said input and output units and further including at least one computer which comprises a hierarchically intermediate computer, said hierarchically intermediate computer being connected to at least two computers belonging to said hierarchically lowest computers.

6. A system according to claim 5, further comprising a hierarchically highest computer, said hierarchically highest computer being connected to communicate with all of the others of said computers in said network.

7. A system according to claim 6, wherein said computers are connected in a binary tree configuration and a root of said binary tree is comprised of said hierarchically highest computer.

8. A system according to claims 5, 6 or 7, further comprising a common bus connected to said computers.

9. A system according to claim 8 further comprising a controller unit included within a predetermined number of said computers, each of said controller units being effective for providing an interface to said common bus.

* * * * *